Patented Dec. 26, 1933

1,941,200

UNITED STATES PATENT OFFICE 1,941,200

METHOD OF MANUFACTURING RUBBER GOODS

Wilfred Henry Chapman, Stechford, Birmingham, and Donald Whitworth Pounder, Moseley, Birmingham, England, assignors to Dunlop Rubber Company, Limited, a British company No Drawing. Application November 5, 1929, Serial No. 405,058, and in Great Britain November 14, 1928

5 Claims. (Cl. 18—580)

This invention comprises improvements in or relating to the manufacture of goods of rubber or similar material by any one or more operations such as dipping, spreading, impregnating, spraying, molding, extrusion or electrophoresis from aqueous emulsions, or dispersions of rubber of similar material of the kinds hereinafter specified which are or can be rendered "heat sensitive" by having admixed therein in suspension or in solution such quantities of chemical reagents which are relatively without any gelling action upon the emulsions or dispersions in the cold but which gel the emulsions or dispersions rapidly when they are subjected to heat.

It is the object of this invention to manufacture goods of rubber or similar material by gelling direct from aqueous emulsions or dispersions of rubber or similar material which are or can be rendered "heat sensitive" by the contacting of such "heat sensitive" emulsions or dispersions with a heating medium subsequent to the emulsions or dispersions aforesaid having been brought to the desired shape or layout while still in the fluid state and subsequent to the removal of the aforementioned shaped fluids from the bulk of the emulsions or dispersions.

The emulsions or dispersions of rubber or similar material which are not "heat sensitive" can be rendered "heat sensitive" by the addition to such emulsions or dispersions of gelling agents in sufficient quantity to bring about rapid gelling in the cold or by the addition of substances substantially non-gelling agents in the cold but which become active gelling agents upon the application of heat.

The heating medium may be liquid or gaseous as for example, hot water, steam, hot air, hot gases, hot oils, hot naphthas, molten waxes and molten metals, or any suitable solid heating medium such as a conveyor belt.

With reference to a natural aqueous dispersion of rubber such as the latex of Hevea brasiliensis as received in England (usually preserved with ammonia) whether of normal concentration or in a concentrated form it is known that such does not appreciably coagulate when heated to 90° C. or even higher if the latex is prevented from boiling by applying suitable pressure. Even such latex poured into water at 80° to 90° C. readily disperses in the water, the rate of dispersion depending chiefly on the viscosity.

According to the invention it has been found that if, for example, Hevea brasiliensis latex is rendered "heat sensitive" and is then passed or caused to flow into hot water or other heating medium of the aforesaid kind a skin is immediately formed round the latex the strength of which is sufficint to prevent dispersion of the latex into the surrounding medium.

It has also been found that the strength and thickness of the surface skin readily increases until the whole mass of the latex has set into a gel of firm structure.

The emulsions or dispersions comprise, by way of example, those consisting of or containing rubber, gutta-percha, balata or similar vegetable resins occurring naturally or artificially obtained and in vulcanized or unvulcanized condition. Aqueous dispersions of coagulated rubber, vulcanized rubber, waste or reclaim may also be employed if desired as alternatives or admixtures. Any of the aforesaid dispersions may contain the usual known compounding ingredients and/or may be in concentrated form.

If the aqueous dispersion is not in itself "heat sensitive" it may be rendered so by the addition of gelling agents such as suitable organic or other acids, or acid salts or suitable metallic salts employed in such quantity as to produce substantially no gelling or coagulation, or only a slow gelling or coagulation, in the cold but complete or rapid gelling when heated.

Small quantities of one or more non-coagulating or non-gelling substances which decompose or interact by rise in temperature with a formation of one or more acid coagulants or gelling agents for latex, as for example, ammonium persulphate with or without trioxymethylene can be employed.

An example of a "heat sensitive" latex mixing is as follows:—

A latex cream of the following composition prepared by electrodeposition:—

| | Parts by weight | |
|---|---:|---:|
| Rubber | 100 | |
| Sulphur | 3 | |
| Zinc oxide | 1 | |
| Mercapto-benzothiazole | 0.3 | |
| Casein | 1 | 100 |
| Water | 110 | |

The compounding ingredients are added to the latex in the form of suitable dispersions. With such a mix and employing zinc anodes creamy or paste-like deposits are obtained with a current density of 0.2 amperes to 4 amperes per sq. decimetre.

The following latex mixing is an example of a latex mixing which can be rendered "heat sensitive" and is suitable for carrying out the present invention.

Latex concentrated to 60% rubber content by centrifuged action preserved with approximately 0.5% ammonia is compounded to give the following composition.

| | Parts by weight |
|---|---|
| Rubber | 100 |
| Sulphur | 5 |
| Mineral oil | 10 |

The total amount of solid in this latex mixing is approximately 58% by weight.

The ammonia content of the mixing is reduced by known means to 0.05%.

When the above latex mixing is required for use 2 grams of sodium silico fluoride are added as a suspension in 4 c. c's of water to each litre of the latex mixing.

The following examples illustrate how the process can be effected:—

Example 1

An unheated former is dipped or otherwise passed into a heat sensitized mixing at or below normal temperature and on withdrawal placed in an atmosphere of steam or a bath of hot water. It is found that a skin is rapidly formed on the surface of the latex adjacent the heating medium and that it is this skin presumably which prevents the flow of the underneath layer of latex which is still fluid. The former with the deposit may be redipped and the process repeated until the required thickness has been attained. The deposit may be dried on the former or stripped in the wet state as desired. The deposit is then vulcanized or subjected to any further processes that may be required. The unheated former may be in the form of wire. Thus wire may be covered with rubber by this method.

Example 2

A film of sensitized latex mixing is spread in known manner on to a face sheeting (consisting of cloth coated with a substance to prevent adhesion of the gelled latex film) and is passed into a heating medium such as steam, hot air or hot water. When the film has gelled it may be dried on the sheeting or removed and dried by any known means.

Example 3

Two bands of cloth (specially treated if desired to prevent adhesion of the latex film) are passed between the nip of a two-bowl calender. The heat sensitized latex mixing is fed between the cloth bands and is calendered to the required gauge. The cloth bands with the latex between are then fed into a suitable heating medium. After gelling of the latex mixings the cloth bands are stripped and the rubber sheet thus produced is dried or otherwise treated as desired.

Example 4

If cord or other fabric is passed through the nip of the calender arranged with treated cloth bands as described in Example 3, the fabric may be coated on one or both sides as desired.

Example 5

Heat sensitized latex is caused to flow into hot water or other suitable heating medium through a die shaped according to the article to be produced and it is found that the skin formed imparts sufficient rigidity to the latex to enable it to retain its shape until the whole mass sets to a firm gel. When sufficiently firm the rubber is dried or otherwise treated as desired. In this manner tubes, sheeting, strips of various sections, tyre treads may be produced.

Example 6

Heat sensitized latex is spread on to a band of suitable cross section and passed into a suitable heating medium such as hot water. It has been found that the latex sets rapidly to a firm gel and can then be removed from the band and dried or otherwise treated. Working according to this example has been found particularly suitable for the production of tire treads.

Example 7

Rubber tubes can be produced by introducing a heat sensitized latex mixing into a rotating horizontal metallic tube. The latex flows evenly on to the sides of the metallic tube and may be set by passing a current of steam or other suitable heating medium into the interior of the tube. When the tube produced is sufficiently rigid it may be withdrawn and dried and otherwise treated as desired.

According to the invention hard or soft rubber articles may be produced by suitable adjustments of the vulcanizing and other compounding ingredients of the latex mixings.

The term "gelling" is meant to signify the change of state of the rubber or the like material in the aqueous dispersion from the dispersed state to the state wherein the rubber forms the continuous phase. The whole of the dispersion medium is included in the pores, capillaries or cells of microscopic or ultra-microscopic dimensions of the structure of the solid produced. The gel so formed is a strong homogeneous irreversible solid structure without pores visible to the naked eye. The microscopic or ultra-microscopic pores, capillaries or cells which contain the serum gradually become smaller or completely disappear on drying of the gel.

Having now particularly described and ascertained the nature of our said invention and in what manner the same is to be performed, we declare that what we claim is:—

1. In the manufacture of goods from rubber and similar aqueous emulsions or dispersions, the method which comprises rendering the emulsion or dispersions heat sensitive and bringing them to the desired shape while still in the fluid state after removal from the bulk of the emulsion and gelling the thus shaped goods by contact with a heating medium.

2. In the manufacture of goods from rubber latex and similar aqueous emulsions or dispersions, the method which comprises rendering such emulsions or dispersions heat sensitive by the addition of a gelling agent, which has substantially no gelling action when cold, but a rapid gelling action when heated, bringing the goods to the desired shape while in a fluid state after removal from the bulk of the emulsion or dispersion and gelling the thus shaped goods by the application of heat.

3. In the manufacture of goods from rubber and similar aqueous emulsions or dispersions, the method which comprises rendering the emulsions or dispersions heat sensitive and bringing them to the desired shape while still in a fluid state after removal from the bulk of the emulsion or dispersion and gelling the thus shaped goods by contact with a heating medium.

4. The method of claim 1 in which the goods are shaped by dipping a former into the dispersion prior to heating.

5. In the manufacture of goods of rubber from aqueous emulsions or dispersions, the method which comprises rendering the emulsion or dispersion heat sensitive, bringing the mass of said emulsion to a desired shape while still in a fluid state after removal from the bulk of the emulsion, and coagulating the thus shaped goods by means of a fluid heating medium surrounding said shaped mass.

WILFRED HENRY CHAPMAN.
DONALD WHITWORTH POUNDER.